US012499728B2

(12) United States Patent
Danielson et al.

(10) Patent No.: US 12,499,728 B2
(45) Date of Patent: Dec. 16, 2025

(54) BUTTON SENSING METHODS IN GAMING ENVIRONMENT

(71) Applicant: IGT, Las Vegas, NV (US)

(72) Inventors: Patrick Danielson, Las Vegas, NV (US); Samantha Ascheri-Phillips, Reno, NV (US); Dwayne Nelson, Las Vegas, NV (US); Vincent S. Lai, Las Vegas, NV (US)

(73) Assignee: IGT, Las Vegas, NV (US)

( * ) Notice: Subject to any disclaimer, the term of this patent is extended or adjusted under 35 U.S.C. 154(b) by 317 days.

(21) Appl. No.: 18/128,058

(22) Filed: Mar. 29, 2023

(65) Prior Publication Data

US 2024/0331488 A1 Oct. 3, 2024

(51) Int. Cl.
*G07F 17/32* (2006.01)

(52) U.S. Cl.
CPC ...... *G07F 17/3209* (2013.01); *G07F 17/3293* (2013.01)

(58) Field of Classification Search
None
See application file for complete search history.

(56) References Cited

U.S. PATENT DOCUMENTS

2021/0295656 A1* 9/2021 Fong .................. G07F 17/3213
2022/0309871 A1* 9/2022 Hawkins ................ G07F 17/34
2025/0070548 A1* 2/2025 Rhein ..................... H02H 7/22

* cited by examiner

*Primary Examiner* — Ronald Laneau
(74) *Attorney, Agent, or Firm* — Sage Patent Group

(57) ABSTRACT

An electronic gaming machine ("EGM") can include a processor circuit and a memory coupled to the processor circuit. The memory can include machine-readable instructions that, when executed by the processor circuit, cause the EGM to perform operations. The operations can include determining a position of a selector relative to a button while the button is in an inactive state. The operations can further include adjusting operation of the EGM based on the position of the selector relative to the button while the button is in the inactive state.

20 Claims, 12 Drawing Sheets

BUTTON SENSING METHODS IN GAMING ENVIRONMENT

BACKGROUND

Embodiments described herein relate to electronic gaming machines ("EGMs"). EGMs can include one or more games (e.g., wagering games) stored therein that can be played by a player. The EGM can provide a prize to the player based on a wager and an outcome of a wagering game. An example of a wagering game includes a slot game in which, in response to receiving a wager from the player, one or more rows of symbols are revealed. A prize can be provided to the player based on the one or more rows of symbols including one or more winning combinations of symbols.

SUMMARY

According to some embodiments, an electronic gaming machine ("EGM") is provided. The EGM includes a processor circuit and a memory coupled to the processor circuit. The memory includes machine-readable instructions that, when executed by the processor circuit, cause the EGM to perform operations. The operations include determining a position of a selector relative to a button while the button is in an inactive state. The operations further include adjusting operation of the EGM based on the position of the selector relative to the button while the button is in the inactive state.

According to other embodiments, an electronic gaming machine ("EGM") is provided. The EGM includes a processor circuit, a button coupled to the processor circuit, and a memory coupled to the processor circuit. The button is configured to trigger an action in response to being activated. The memory includes machine-readable instructions that, when executed by the processor circuit, cause the EGM to perform operations. The operations include determining that a finger of a user is within a threshold distance of the button without activating the button. The operations further include, responsive to determining that a finger of a user is within a threshold distance of the button without activating the button, outputting information associated with the action without performing the action.

According to other embodiments, an electronic gaming machine ("EGM") is provided. The EGM includes a processor circuit, a button coupled to the processor circuit, and a memory coupled to the processor circuit. The button is configured to trigger a first action in response to being activated. The memory includes machine-readable instructions that, when executed by the processor circuit, cause the EGM to perform operations. The operations include determining a position of a selector relative to the button while the button is not activated. The operations further include, responsive to determining the position of the selector relative to the button while the button is not activated, configuring the button to trigger a second action in response to being activated, the second action being different than the first action. The operations further include, subsequent to configuring the button to trigger the second action, determining that the button is activated. The operations further include, responsive to determining that the button is activated, performing the second action.

According to various embodiments, EGMs, systems, methods, and non-transitory computer-readable medium are provided for performing the above embodiments.

DETAILED DESCRIPTION

Electronic gaming machines ("EGMs") can attract and retain players by offering a diverse selection of games. In some examples, existing EGMs are updated and/or retrofitted to offer new games. This can result in an EGM having buttons that were not specifically designed for a specific game. In additional or alternative examples, game can include various game features associated with different buttons that may not be intuitive to every player. In these examples and others, players may become confused, frustrated, or intimidated by a game based on its mapping of buttons to specific game functions.

Various embodiments herein describe methods for providing player feedback and information when a button is touched (but not pressed) and/or a selector (e.g., a finger) of a player is hovered on a button. In some embodiments, the feedback assists a player by indicating to which game function a button is mapped. In additional or alternative embodiments, the feedback assists a player by providing the player with additional information regarding the game function mapped to the button. In some examples, a player may receive help or information about a functionality of a button without actually using the button.

These innovations can be used with various EGMs. In some examples, the EGM is a slot machine. In additional or alternative examples, the EGM is an electronic gaming table, kiosk, sports wagering terminal, or a video lottery terminal ("VLT"). These innovations can be used with various button types. In some examples, the button is a physical button. In additional or alternative examples, the button is a virtual button on a touch screen. These innovations can be included in new EGMs or existing EGMs can be retrofitted to implement these innovations.

Figure 1:
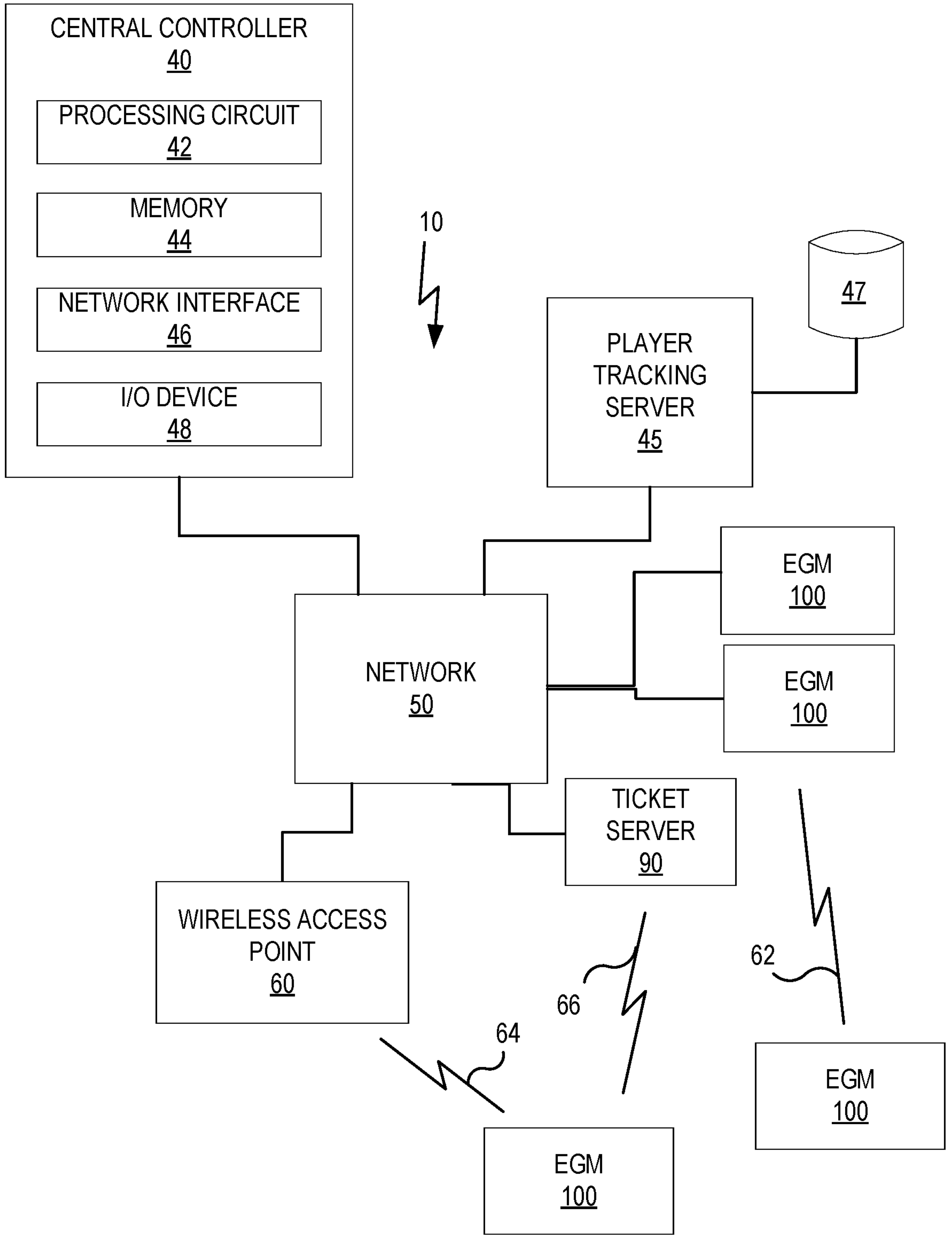
FIG. 1 is a schematic block diagram illustrating an example of a network configuration for a plurality of gaming devices according to some embodiments.

Before describing these and other embodiments in detail, reference is made to FIG. 1, which illustrates a gaming system 10 including a plurality of gaming devices 100. As discussed above, the gaming devices 100 may be one type of a variety of different types of gaming devices, such as electronic gaming machines (EGMs), mobile devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The central controller 40 can include processing circuit 42, memory 44, network interface 46, and an input/output ("I/O") device 48. In some examples, the memory 44 includes instructions executable by processing circuit 42 for causing the central controller 40 to perform operations. The operations can include communicating with the data communication network 50 via the network interface 46 and/or communicating with a user/operator via the I/O device 48.

The data communication network 50 may be a private data communication network that is operated, for example, by the gaming facility that operates the gaming devices 100. Communications over the data communication network 50 may be encrypted for security. The central controller 40 may be any suitable server or computing device which includes at least one processor circuit and at least one memory or storage device. Each gaming device 100 may include a processor circuit that transmits and receives events, messages, commands or any other suitable data or signal between the gaming device 100 and the central controller 40. The gaming device processor circuit is operable to execute such communicated events, messages or commands in conjunction with the operation of the gaming device 100. Moreover, the processor circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processor circuits. Moreover, in some embodiments, one or more of the functions of one or more gaming device processor circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processor circuit that transmits and receives events, messages, commands or any other suitable data or signal between the ticket server 90 and the central controller 40. The ticket server 90 processor circuit may be operable to execute such communicated events, messages or commands in conjunction with the operation of the ticket server 90. Moreover, in some embodiments, one or more of the functions of one or more ticket server 90 processor circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, an NFC link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
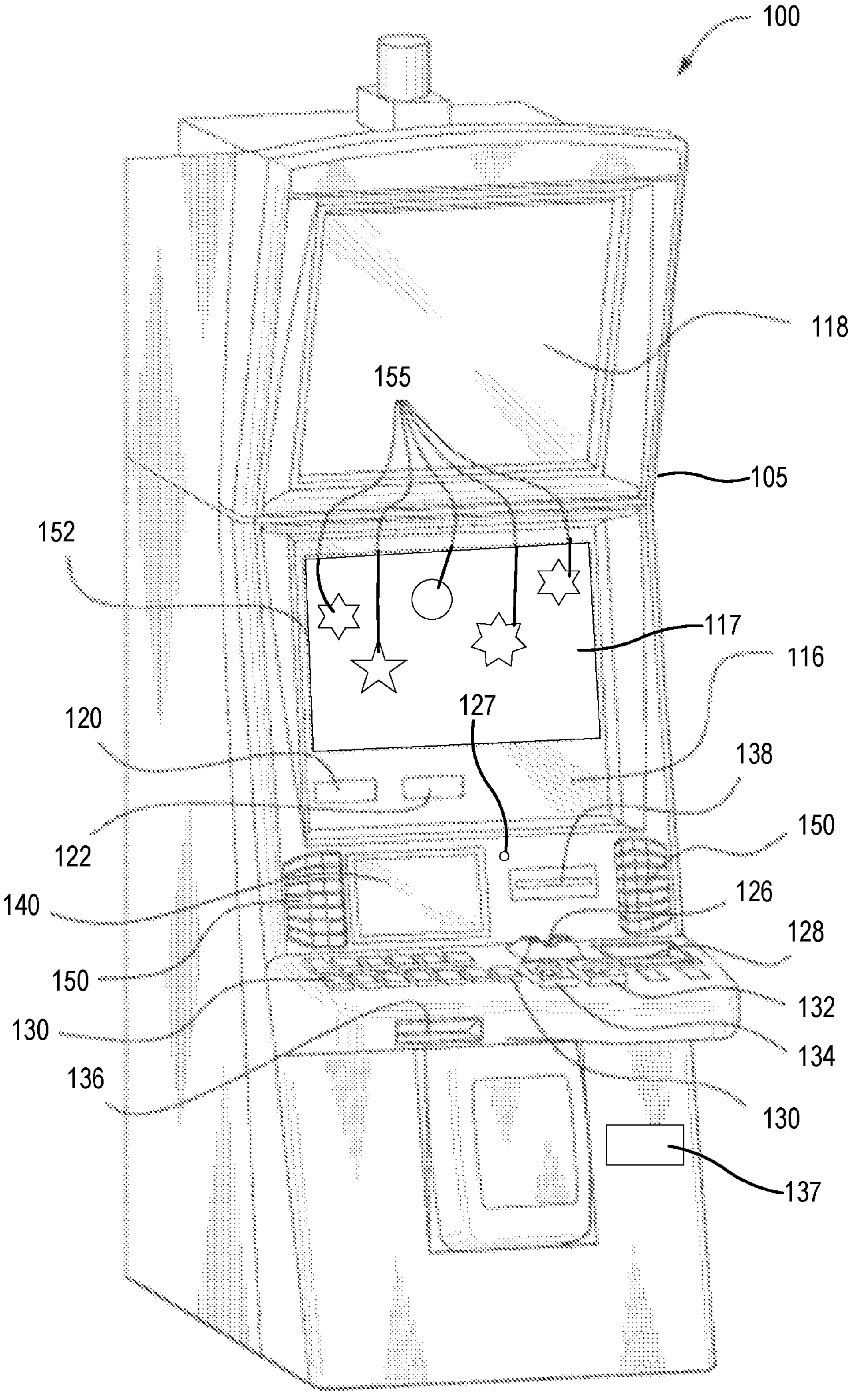
FIGS. 2A-E are diagrams illustrating examples of gaming devices according to some embodiments.
Figure 2B:
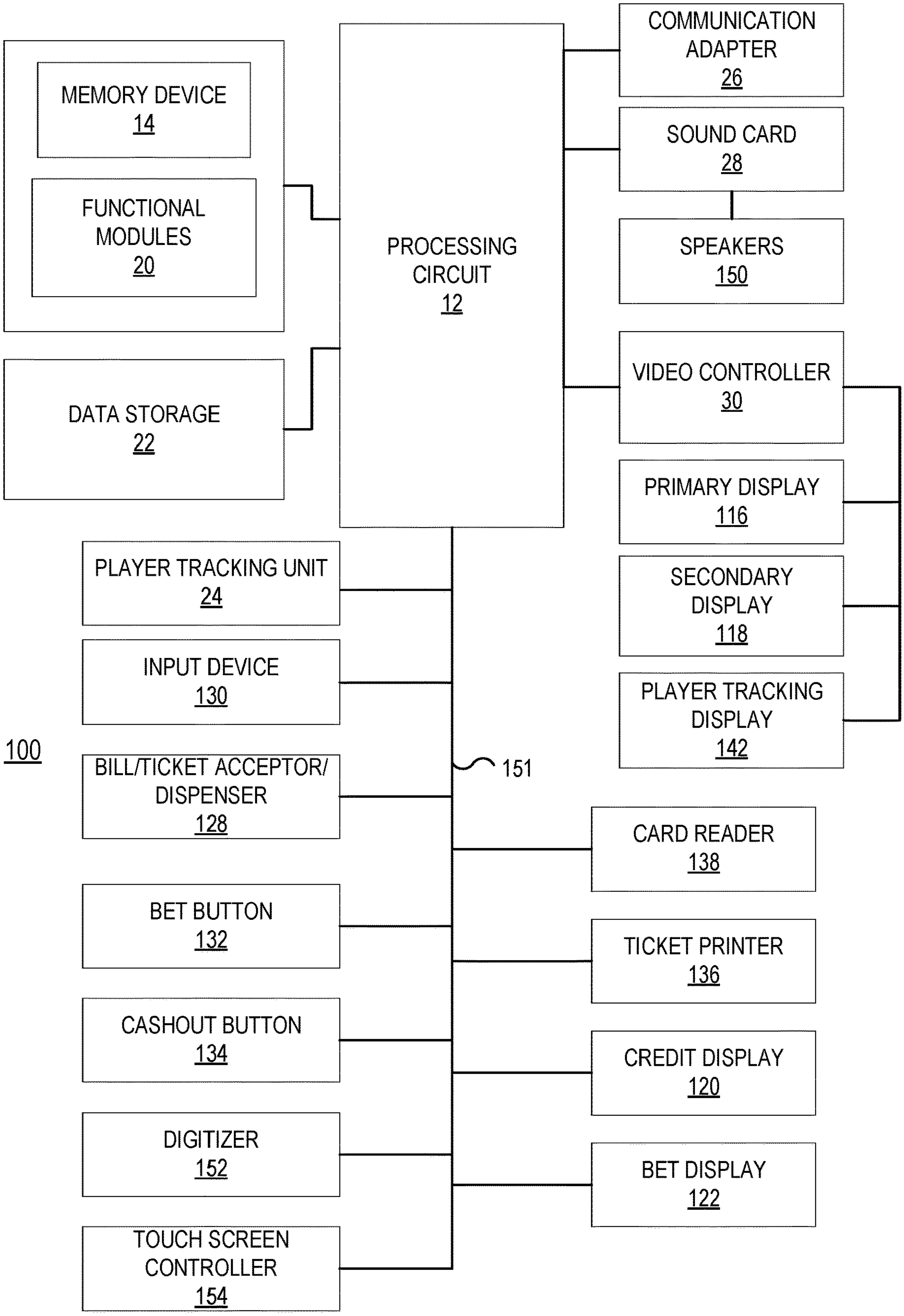
Figure 2C:
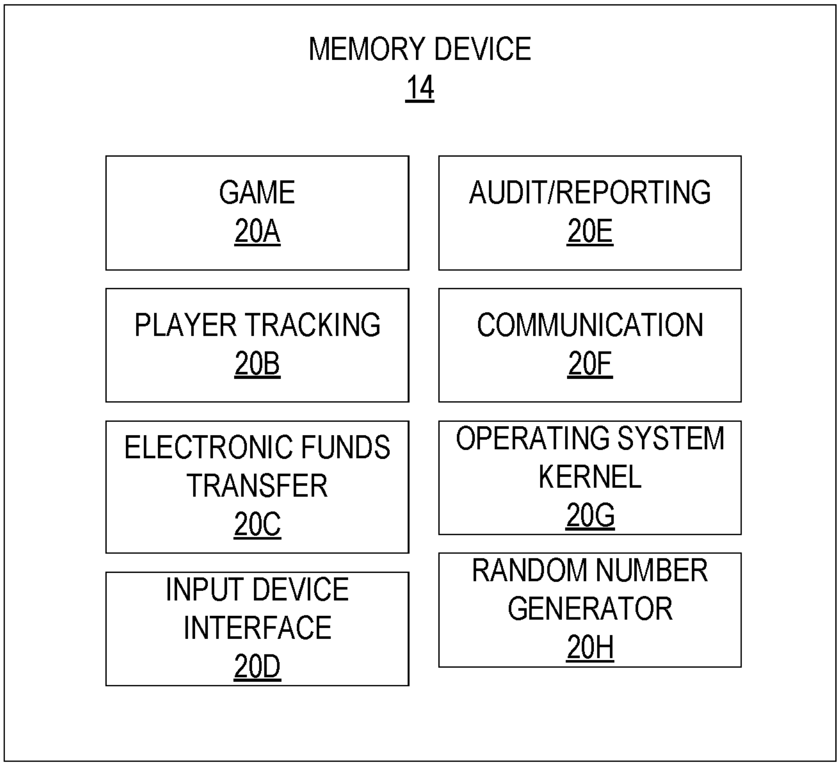

Embodiments herein may include different types of gaming devices. Various embodiments are illustrated in FIGS. 2A-2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A-C are provided as examples for illustrative purposes only. It will be appreciated that gaming devices may come in many different shapes, sizes, layouts, form factors, and configurations, and with varying numbers and types of input and output devices, and that embodiments of the inventive concepts are not limited to the particular gaming device structures described herein.

Gaming devices 100 typically include a number of standard features, many of which are illustrated in FIGS. 2A-B. For example, referring to FIG. 2A, a gaming device 100 may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processor circuit 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processor circuit 12. In some embodiments however, the credit display 120 and/or the bet display 122 may be driven by the video controller 30. The gaming device 100 may also include a player tracking unit 24 for managing communications and functionality between the processor circuit 12 and certain peripherals and components. Player tracking units 24 may be standardized across machine types to operate interchangeably across a manufacturer's lineup.

Referring again to FIG. 2A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket printer 136, a bill/ticket acceptor/dispenser 128, that allows the player to deposit and/or receive tickets and/or currency into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processor circuit 12 that controls operations of the gaming device 100. Although illustrated as a single processor circuit, multiple special purpose and/or general-purpose processors and/or processor cores may be provided in the gaming device 100. For example, the gaming device 100 may include one or more of a video processor, a signal processor, a sound processor and/or a communication controller that performs one or more control functions within the gaming device 100. The processor circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processor circuit 12. It will be appreciated that the components may be connected to the processor circuit 12 through a system bus 151, a communication bus and controller, such as a USB controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processor circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FcRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the gaming device 100 to communicate, for example, with a mobile communication device operated by a player.

The gaming device 100 may include one or more internal or external communication ports that enable the processor circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor circuit through a universal serial bus (USB) hub (not shown) connected to the processor circuit 12.

In some embodiments, the gaming device 100 may include a sensor, such as a camera 127, in communication with the processor circuit 12 (and possibly controlled by the processor circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processor circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back-end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

Many embodiments described herein employ gaming devices 100 that are land-based EGMs, such as banks of slot machines in a casino environment, but in some embodiments, a gaming device 100 may additionally or alternatively include a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
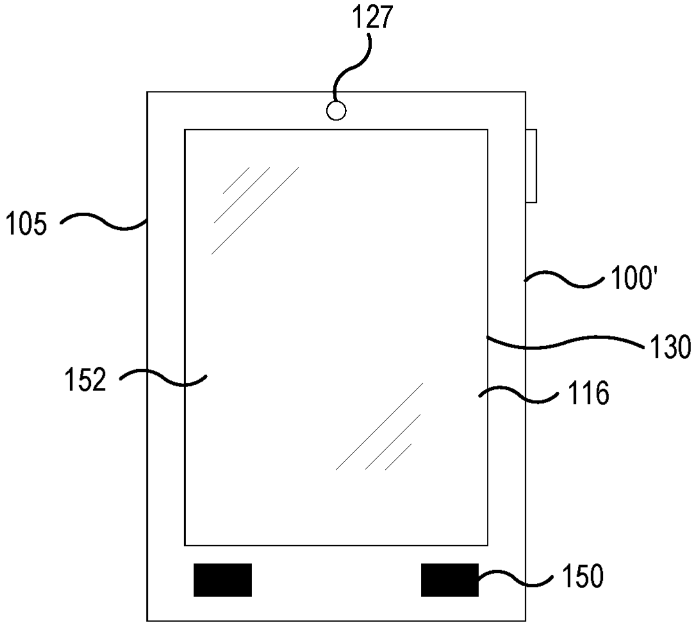

For example, referring to FIG. 2D, a gaming device 100' may be implemented as a handheld device including a compact housing 105 on which is mounted a touchscreen display device 116 including a digitizer 152. As described in greater detail with respect to FIG. 3 below, one or more input devices 130 may be included for providing functionality of for embodiments described herein. A camera 127 may be provided in a front face of the housing 105. The housing 105 may include one or more speakers 150. In the gaming device 100', various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100' may omit certain features, such as a bill acceptor, a ticket generator, a coin acceptor or dispenser, a card reader, secondary displays, a bet display, a credit display, etc. Credits can be deposited in or transferred from the gaming device 100' electronically.

Figure 2E:
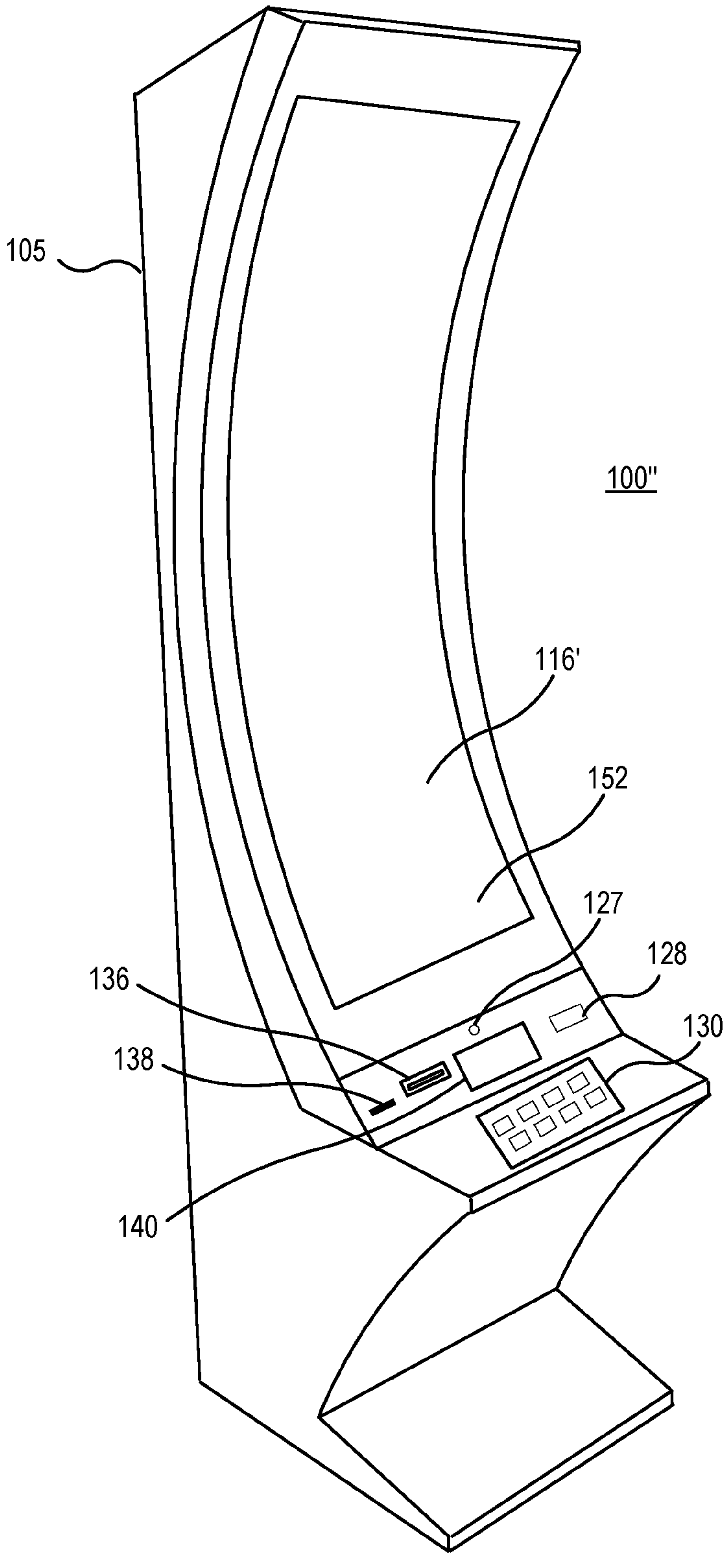

FIG. 2E illustrates a standalone gaming device 100'', i.e., an EGM in this example, having a different form factor from the gaming device 100 illustrated in FIG. 2A. In particular, the gaming device 100'' is characterized by having a large, high aspect ratio, curved primary display device 116' provided in the housing 105, with no secondary display device. The primary display device 116' may include a digitizer 152 to allow touchscreen interaction with the primary display device 116'. The gaming device 100'' may further include a player tracking display 142, an input device 130, a bill/ticket acceptor 128, a card reader 138, and a bill/ticket dispenser 136. The gaming device 100'' may further include one or more cameras 127 to enable facial recognition and/or motion tracking.

Although illustrated as certain gaming devices, such as electronic gaming machines (EGMs) and mobile devices, similar functions and/or operations as described herein may include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Various embodiments herein describe an EGM adjusting its operation (e.g., providing player feedback and information) in response to a button being touched (but not pressed) and/or determining that a selector (e.g., a finger) of a player is hovering on a button. Herein the term hover can be used to refer to a selector being within a threshold distance of a button without activating the button. In some examples, a selector hovers on a button by being within the threshold distance without touching the button. In additional or alternative examples, the selector hovers on a button by touching the button without applying a threshold amount of pressure to the button (e.g., an amount of pressure required to activate the button).

In some embodiments, adjusting operations of an EGM in response to a selector hovering on a button can help alleviate issues that arise when buttons do not align with the elements on the screen.

Figure 3:
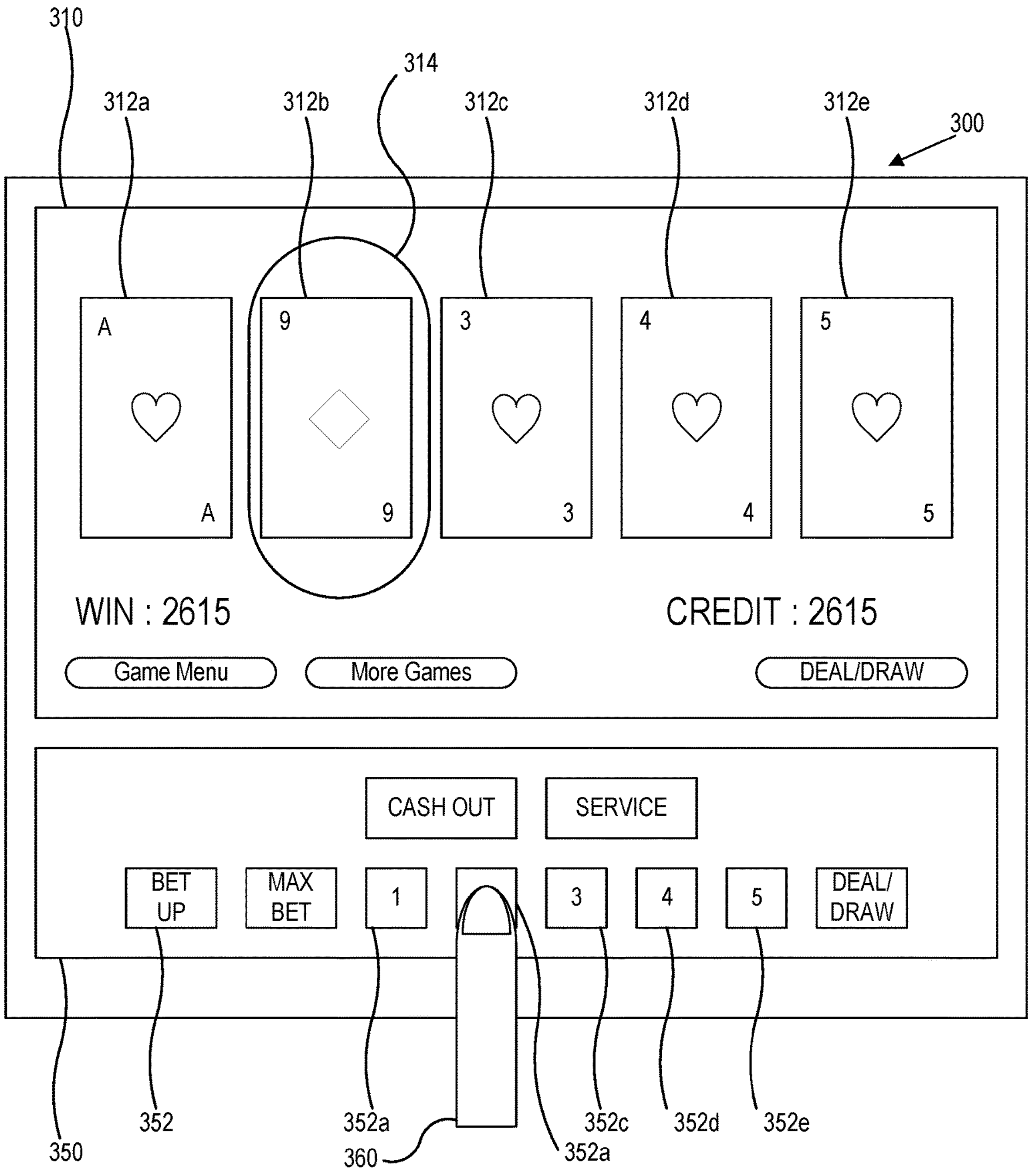
FIG. 3 is a diagram illustrating an example of a visual indicator being displayed by an EGM in response to a selector hovering on a physical button according to some embodiments.

FIG. 3 illustrates an example of an EGM 300 with a display 310 and a physical button panel 350. Here, the physical button panel 350 includes ten physical buttons 352 including five physical buttons 352*a-e* labeled 1-5 (the "2" being underneath the selector 360). Some of these physical buttons 352 may be associated with game functions related to the game being displayed on the display 310. For example, the physical buttons 352*a-e* may each be associated with a game function (e.g., a discard action) related to one of the five virtual cards 312*a-e*. In this example, pressing one of the physical buttons 352*a-e* causes the corresponding virtual card 312*a-e* to be discarded. The physical button 352*a* may be associated with virtual card 312*a*, physical button 352*b* may be associated with virtual card 312*b*, physical button 352*c* may be associated with virtual card 312*c*, physical button 352*d* may be associated with virtual card 312*d*, and physical button 352*e* may be associated with virtual card 312*e*. Since the physical buttons 352*a-e* may not be in-line with their associated virtual card 312*a-c*, new players may be unsure which physical button 352 to press to cause a specific game function.

As illustrated, the selector 360 is a finger of a user and is hovering on physical button 352*b*. In response to the EGM 300 detecting that the selector 360 is hovering on the physical button 352*b*, the EGM 300 is displaying, via the display 310, an indicator 314 around virtual card 312*b* (which is the virtual card 312*a-e* associated with the physical button 352*b*). The indicator 314 can assist the player in understanding which of the virtual cards 312*a-e* will be affected by activating the physical button 352*b*.

In additional or alternative embodiments, in response to determining a selector is hovering on a button, an EGM can output an indication of which physical or digital button is currently selected. In some examples, the output is a visual cue. In additional or alternative examples, the output includes an auditory or haptic feedback that let the user know what button is selected before it is pressed.

In additional or alternative embodiments, in response to determining a selector is hovering on a button, an EGM can output information associated with an action (e.g. a game function) associated with the button. In some examples, the information includes an explanation of the action. In additional or alternative examples, the information includes additional context associated with the action. For example, if pressing a button causes a sports wager to be placed, hovering over the button may cause updated information (e.g., weather, injuries, and recent betting trends) to be collected and displayed.

In additional or alternative embodiments, in response to determining a selector is hovering on a button, an EGM can adjust an action associated with pressing the button. In some examples, in response to determining that the selector is hovering on a wager button, the EGM can determine an identity of a user, determine personalized configurations (e.g . . . , preconfigured bet size) associated with the user, and adjust the bet size associated with pressing the button.

One example of when these innovations could be helpful is described below. Michael is a professional video poker player that likes to bet and play two machines at the same time. By applying this technology, Michael can still easily control the cards in multiple games without double checking to ensure the correct button has been selected. Patrick has vision problems and cannot always read the buttons on the screen. This feature allows him to lightly touch a button on a player panel with a visual and audio cue on the game screen showing Patrick the button currently selected.

In some embodiments, the buttons used in this innovation can be described as buttons that have more than two states. In some examples, a button has the typical "activated" and "inactive" states, but also has at least one other state that is the "selected" or "hover" state. The hover state does not activate the function of the button but can be triggered when a finger is near a button or when the finger is slightly pressing the button without activating the button. In additional or alternative examples, a button may have multiple hover states that each have different associated operations.

FIGS. 4A-C and 5A-B illustrate examples of buttons that can be used in some embodiments described herein.

Figure 4A:
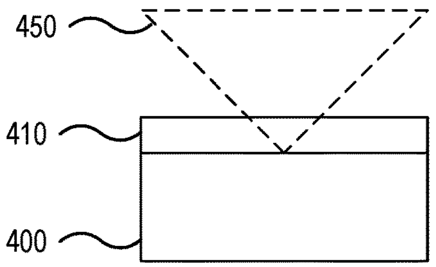
FIGS. 4A-C are schematic diagrams illustrating examples of a touch sensitive button used according to some embodiments.
Figure 4B:
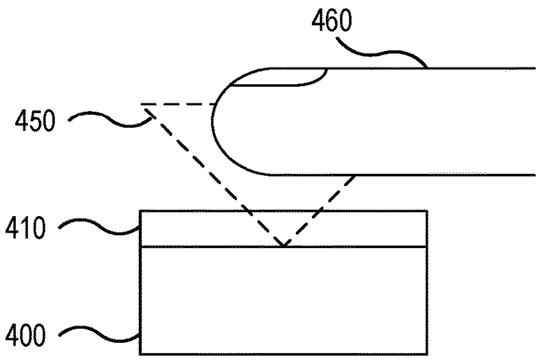
Figure 4C:
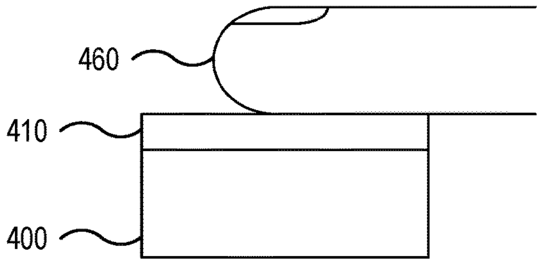

FIGS. 4A-C illustrate an example of a button (e.g., physical or virtual) 400 that includes a touch surface 410. FIG. 4A illustrates the button 400 in an inactive state in which the selector 460 is not within area 450. Area 450 can be defined by a threshold distance from the button 400. In some examples, the button 400 or the corresponding EGM includes a sensor (e.g., a RF sensor or a camera) for detecting whether the selector 460 is within the area 450. FIG. 4B illustrates the button 400 in a hover state (sometimes still referred to herein as an inactive state) in which the selector 460 is within the area 450. FIG. 4C illustrates the button 400 in an active state in which the selector 460 is touching the touch surface 410.

Figure 5A:
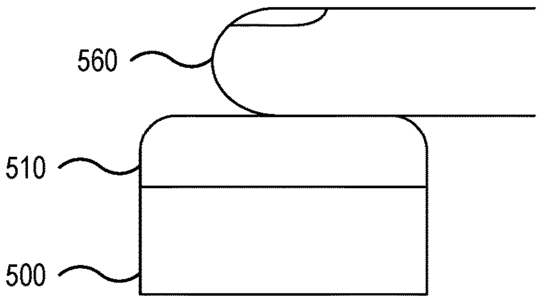
FIGS. 5A-B are schematic diagrams illustrating examples of a pressure sensitive button used according to some embodiments.
Figure 5B:
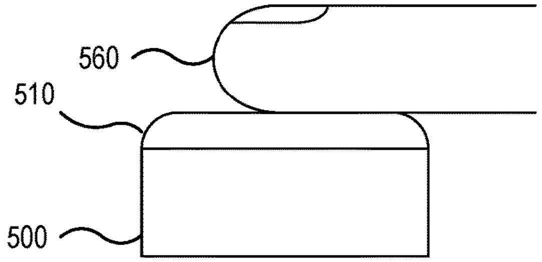

FIGS. 5A-B illustrate examples of a button (e.g., physical or virtual) 500 that includes a pressure sensor 510. FIG. 5A illustrates an example of the button 500 in an inactive state (sometimes referred to herein as a hover state) in which a selector 560 is touching the button 500, but applying less than a threshold amount of pressure to the button 500. In some examples, the button 500 can detect a hover state similarly to the button 400 in FIGS. 4A-C(e.g., using a RF sensor or a camera). FIG. 5B illustrates an example of the button 500 in an active state in which the selector 560 is touching the button 500 and applying greater than a threshold amount of pressure to the button 500. In this example, the pressure sensor 510 is illustrated as being depressed, but any suitable pressure sensor can be used (e.g., including pressure sensors that are activated without depressing the button). For example, a thin film pressure sensor can be implemented with a variable impedance (or an electrical resistance) such that the more pressure that is applied the more (or less) resistance is measured giving an infinite number of states due to the analog nature of the device (a threshold resistance could define specific states). The same can be same for touch sensitive devices, like touch screens; there are many ways to touch a device and therefore many potential hover states.

In some embodiments, a physical button (sometimes referred to as a switch) encases two different mechanical or electrical switches. One triggers the hover with a small movement of the physical switch and the other activates the button with a larger movement.

In additional or alternative embodiments, if the surface area of the button is large enough, the sensing feature can implement with a directional detection. For example, the button could enter different states based on a finger being rolled in a specific direction over the button.

Figure 6:
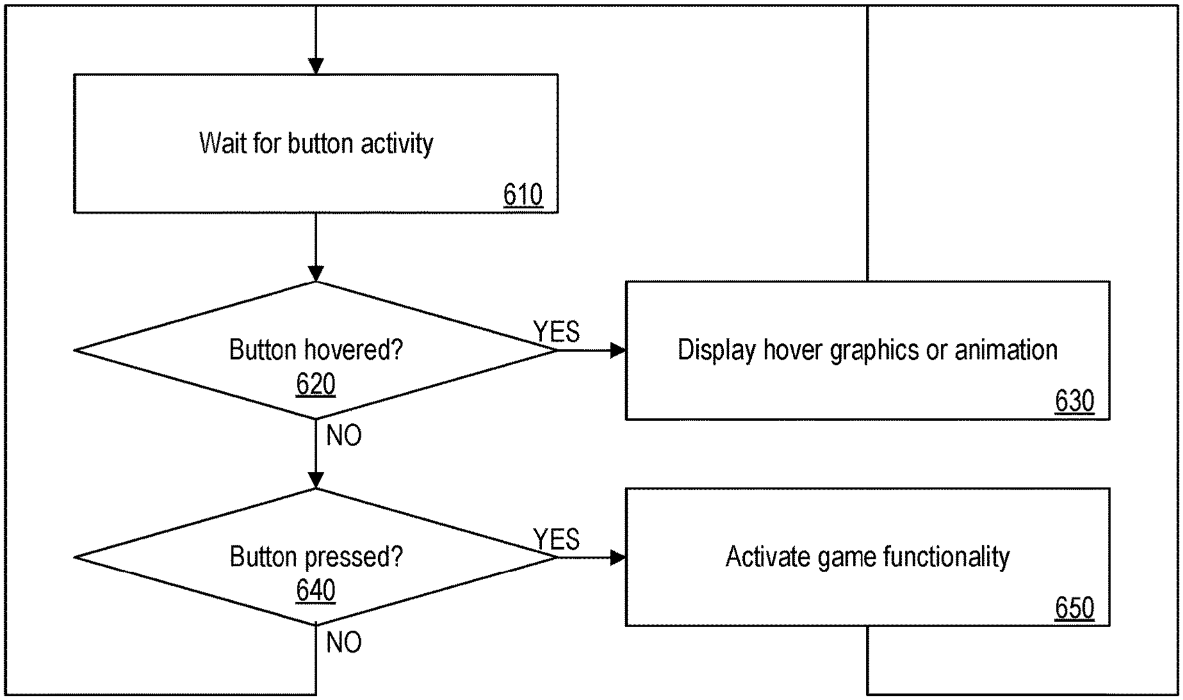
FIG. 6 is a flow chart illustrating an example of operations performed by an EGM according to some embodiments.

FIG. 6 illustrates an example of an EGM performing operations based on button activity. At block 610, the EGM waits for button activity. At block 620, the EGM determines if the button activity includes the button being in a hover state. If so, the EGM proceeds to block 630 where the EGM performs specific actions (e.g., displaying hover graphics or animation). If not, in block 640 the EGM determines if the button activity includes the button being pressed. If so, the EGM proceeds to block 650, where the EGM activates the game functionality associated with the button.

Figure 7:
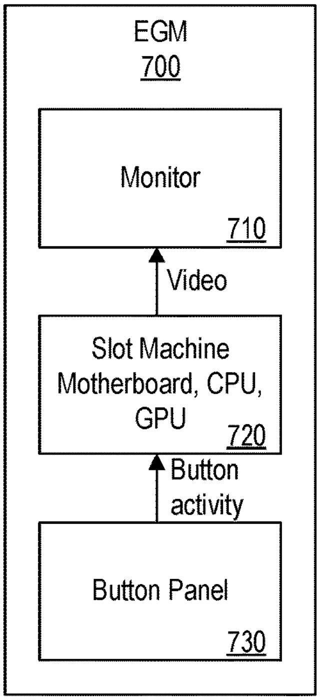
FIGS. 7-8 are block diagrams illustrating examples of EGMs configured to implement the innovations according to some embodiments.

In some embodiments, an EGM can include a button panel that detects button activity (hover state and button press) and a processing circuit that can adjust its output based on the type of button activity. FIG. 7 illustrates an example of an EGM cabinet 700 configured to perform some embodiments described herein. There is a processing circuit 720 (e.g., a logic controller which includes a central processing unit ("CPU") and/or a graphical processing unit ("GPU"). The button panel 730 interfaces with the processing circuit 720 using USB, serial, or other electrical interface. The processing circuit 720 can have a video port that interfaces to the monitor 710 using DVI, HDMI, Display port, or another video interface.

Figure 8:
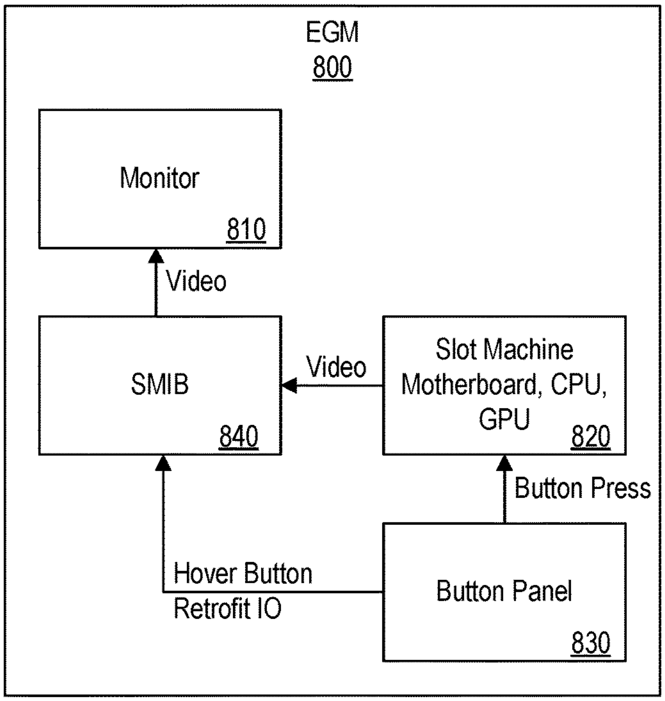

In additional or alternative embodiments, the present innovations can be added to existing EGMs or games that were not specifically designed for the feature by using a retrofit device or procedure. FIG. 8 illustrates an example of the present innovation in a retrofit configuration. A Slot Machine Interface Board ("SMIB") 840 can be introduced. In some examples, the SMIB 840 can be used to interface the slot machine 800 to a host accounting system (not shown). The video (display information) from the processing circuit 820 is directed to the SMIB (rather than directly to the monitor 810). The hover button events are sent to the SMIB 840 from the button panel 830. These events could come from a new type of panel, or touch or pressure device attached to the surface of the retrofit machine.

The SMIB 840 detects the hover and provides the overlay image to the monitor 810 by combining the slot machine video with some overlay graphics or animations. In some examples, the SMIB 840 would load the correct overlay and over configuration for each game type. When a game is selected by the player, the EGM 800 notifies the SMIB 840. This is likely achieved using the SAS protocol. In SAS, this could be achieved with the long poll 0x53 (Send Game N Configuration). The SMIB 840 then can load an overlay based on the game or theme.

In some examples, the SMIB 840 can enable and disable the hover display feature when a game is selected for which there is no overlay or for which the feature is disabled. The SMIB 840 can disable the feature when the EGM 800 is tilted, in a handpay, not in a game, otherwise not currently playing a game. This can prevent overlay graphics from being shown when not appropriate.

A slot machine may be developed in two software layers. For example, a slot machine may be developed with a platform layer that interacts with the hardware and on top of the platform layer is game software.

In some embodiments, the "overlay" can be achieved by the platform software. The platform layer can draw windows or art on top of the game display to achieve the present innovations and hover functionality.

Figure 9:
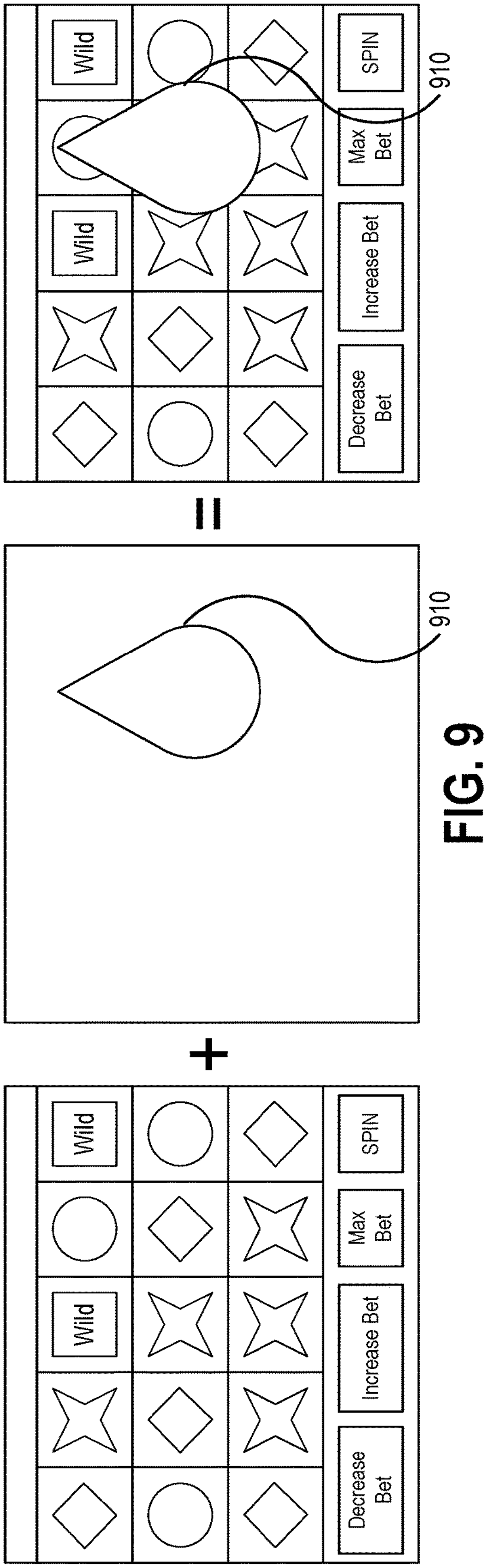
FIGS. 9-10 are diagrams illustrating examples of overlaying on an EGM display according to some embodiments.
Figure 10:
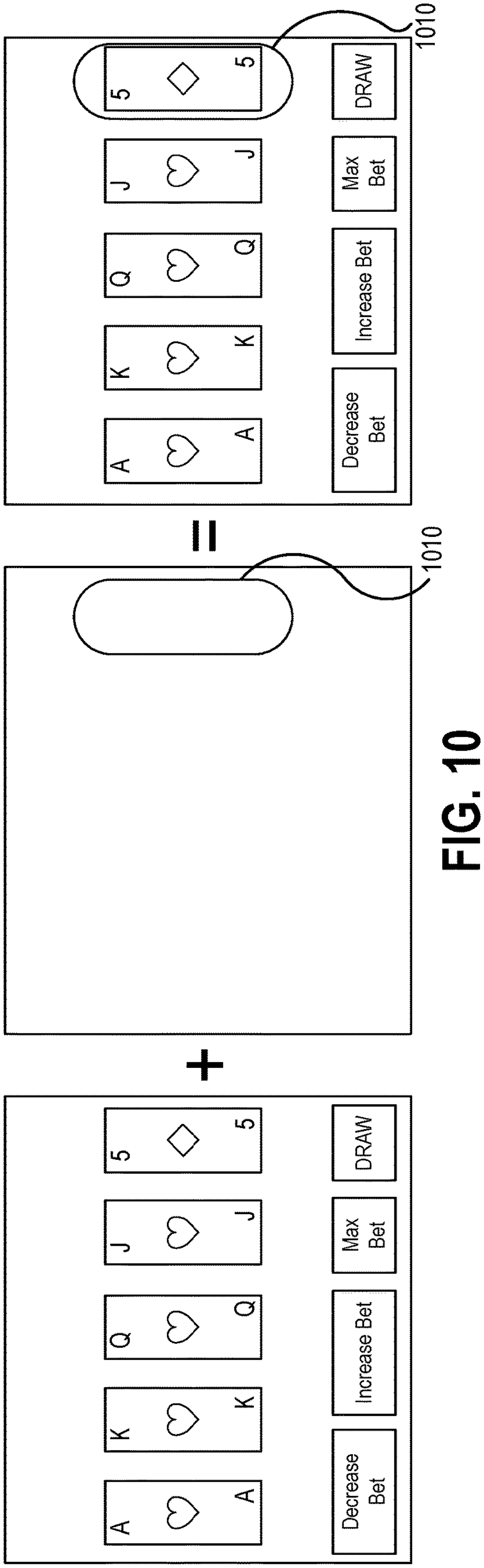

FIGS. 9-10 illustrate examples of overlaying, which is a processing of combining two images. FIG. 9 illustrates an example in which the overlay 910 is not transparent. However, an overlay 1010, as illustrated in FIG. 10, can have transparency as to allow the game screen output to be seen behind the overlay. This may be necessary as to not obscure the game art beneath the overlay. This can be important to ensure the regulatory compliance of the feature.

DPP is a touch panel version of a button panel. The DPP does not use physical buttons, but rather a touch screen. As a result, the hover may not be triggered by touch. In some examples, the hover is determined from a hand gesture recognition device. When a finger is close to the touch screen or DPP, the gesture recognition device can trigger the hover event. In additional or alternative examples, the hover is determined using a pressure or force sensitive touch screen for the game screen or DPP screen. A light touch is detected as a hover and a more forceful touch is detected as an activation or traditional touch.

In some embodiments the hovering feature is configurable. In some examples, the configuration is configured to be limited to just one hovering button at a time. In additional or alternative examples, the configuration allows the configuration of the transparency of the overlay. In additional or alternative examples, the configuration allows the choice of different layouts for the hover locations. In additional or alternative examples, the configuration allows the user to select the locations for each overlay graphic. In additional or alternative examples, the configuration allows for the choice of type of icon graphic, animation, text, or animate effect. In additional or alternative examples, the configuration allows the operator to trigger the button activation when the hover state is present.

In additional or alternative embodiments, a configuration interface might allow the configuration of the feature per game type, game theme, paytable. For example, the feature might be enabled when a player is playing a poker game but disabled when a player is playing a slot game.

In additional or alternative embodiments, configurations, such as layout, are loaded into the EGM, SMIB or host system. The configurations are files that describe the layout of the hover locations and images or animations to use.

In additional or alternative embodiments, an addition of mini-games or side bets could be instituted along with the main game theme to add additional betting opportunities to the currently played game.

In some embodiments, in response to determining that a button is in a hover state, the EGM may display an image. In additional or alternative embodiments, the EGM may display an animation or text. In additional or alternative embodiments, the EGM stops or adjusts the image/animation/text in response to the button being pressed.

In additional or alternative embodiments, the hover feature can provide additional information to the player or user. In some examples, the hover feature displays a help text. For example, hovering over different buttons can cause the EGM to display an explanation of each button to the user (e.g., the meaning of the wager, type of wager, odds of the wager, or rules for the wager).

In additional or alternative embodiments, the hover feature indicates the current configuration of the button. For example, a slot game will have a "MAX BET" button. Hovering over the "MAX BET" button might show the player that the value of the maximum bet is currently $5.00. The hover text might show which feature is enabled. For example, hovering over the "MAX BET" might show the player that the bonus is enabled with the button, the RTP, or odds.

In additional or alternative embodiments, the hover feature varies over the buttons. For example, the buttons might trigger plays at 1 line, 5 lines, 25 lines, 50 lines and 100 lines. The hover might show the hover graphic increasingly large, interesting, or fun. For example, the 1 line hover graphic might be small and simple and the 100 line hover graphic might be larger, have an animation and be more pleasing or otherwise indicating that the 100 line play has more features or may pay more money.

In some examples, in response to a player hovering over a cashout button, the display may display show the player that a cashout would be $12.50 to a ticket. In another example, the hover could show that the ticket printer is missing paper so cashout will result in a handpay or attendant interaction.

In additional or alternative examples, a hover display could show historical information such as a graph of a value over time or the time, date and/or amount of a particular feature. For example, a graph of the credit meter over time could be shown or a display could indicate the last time somebody hit a bonus and how much that person won.

In some embodiments, the overlay is a movie or animation helping the player understand the feature. In some examples, on a sports wagering terminal the player hovers over the wager button and a video shows the player how to build a parlay ticket using the user interface. In additional or alternative examples, on a sports wagering terminal the player hovers over the wager button and a video shows a broadcast of the sporting event.

Figure 11:
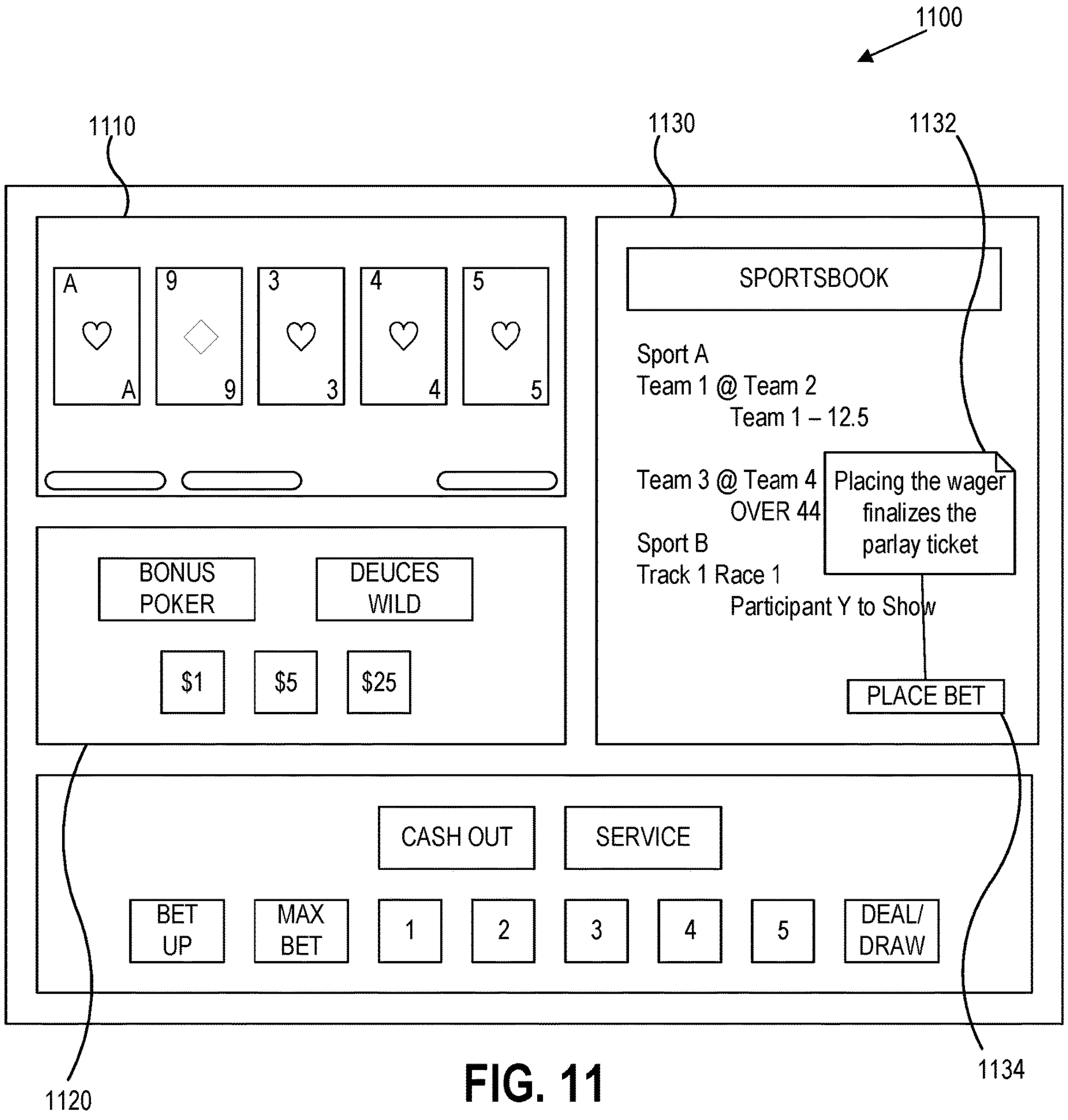
FIG. 11 is a diagram illustrating an example of information being displayed by an EGM in response to a selector hovering on a virtual button according to some embodiments.

FIG. 11 illustrates an example of an EGM displaying multiple wagering activities (e.g., a poker game 1110, a keno game 1120, and a sportsbook 1130). The hover text 1132 shows the player that the virtual button 1134 (e.g., the "PLACE BET" button) will finalize the parlay ticket the player has selected in the sportsbook 1130. The hover text 1132 may be present response to a selector hovering on the virtual button 1134 (not illustrated here for visibility). This can be helpful text for the player. Sports wagering can involve many types of wagering with different types of odds, the complexity of which can be compounded by having different wagering activities on the same display. This present innovation could show the odds, methods, dates, times, or event information associated with pressing a specific "place bet" button (there could be multiple on the same screen associated with different wagering activities). This display could show graphs of historical trends, such as the win/loss of a team over time.

Figure 12A:
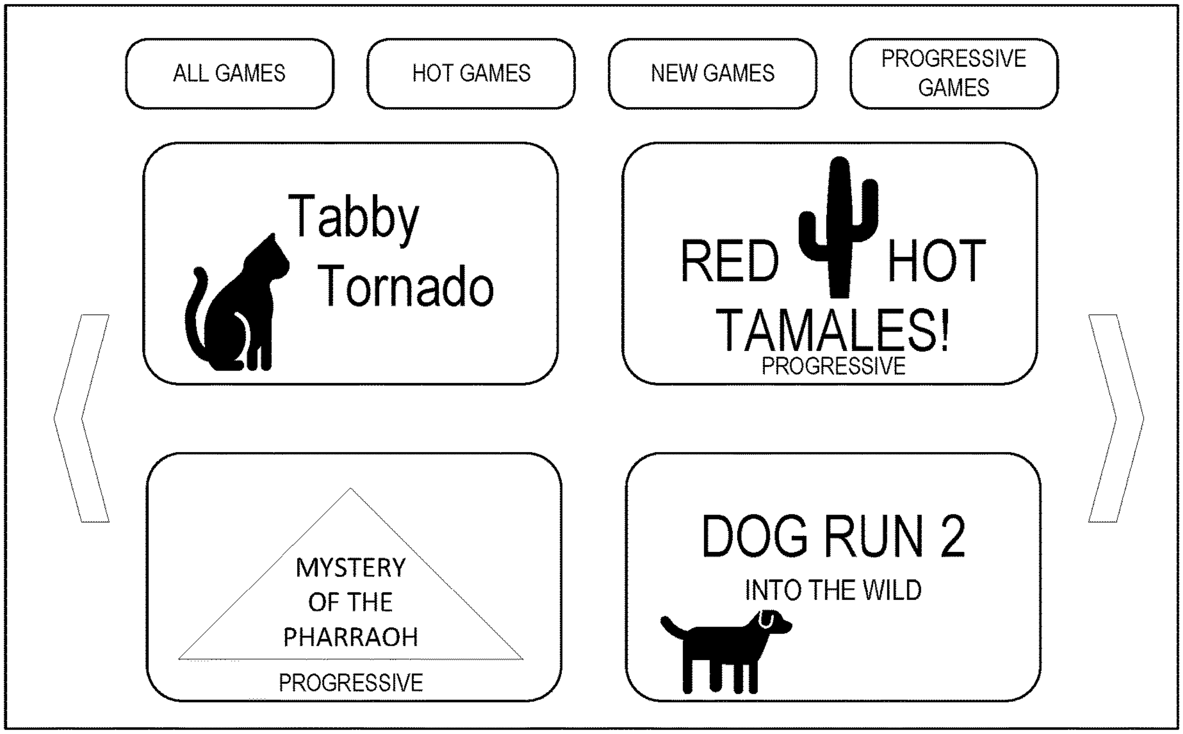
FIGS. 12A-B are diagrams illustrating an example of information being displayed by an EGM in response to a selector hovering on a virtual button according to some embodiments.
Figure 12B:
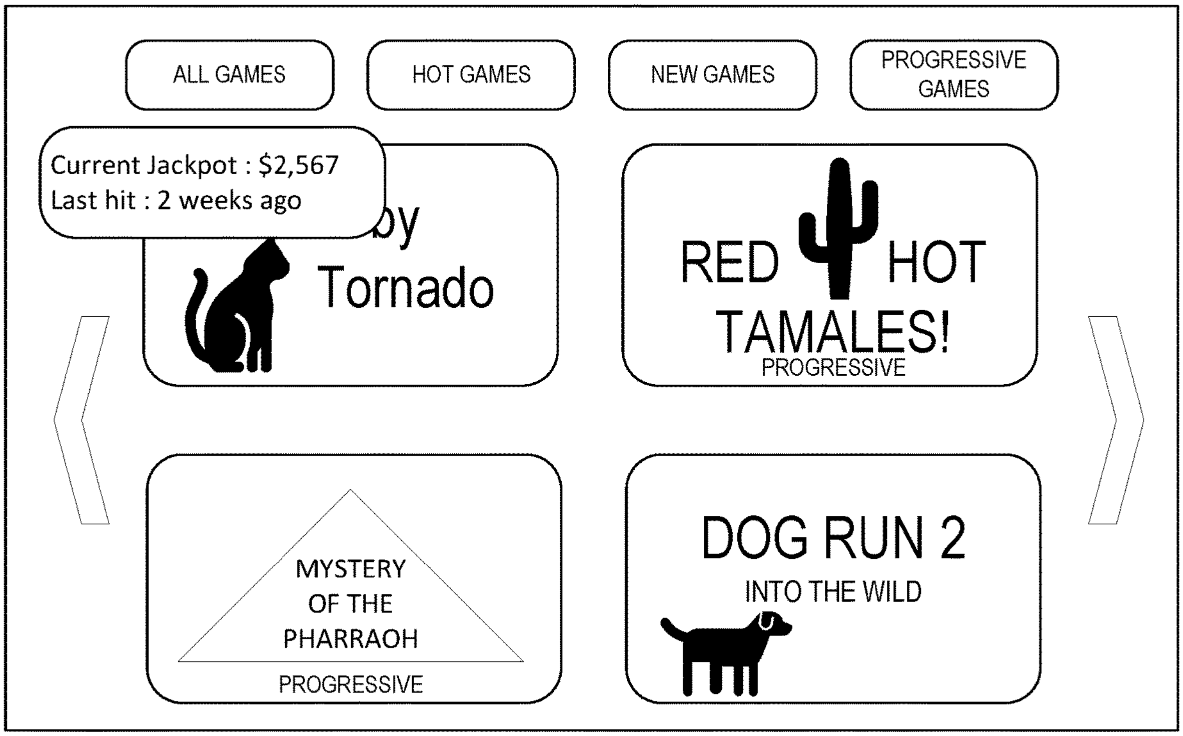

A typical slot machine may have multiple games. The user or player can use a chooser (e.g., a game menu) to select a game. The chooser slows the list of games the player can choose, typically as an arrangement of icons for each game as illustrated in FIG. 12A. Selecting the icon, launches the game. In some embodiments, when hover activity is detected over the game icon the display can show, as illustrated in FIG. 12B, information (e.g., the current progressive amounts, version of the game, denominations configured for the game, language of the game, last jackpot of the game, payback percentage of the game (real or theoretical), install date of the game or other configuration information).

Figure 13:
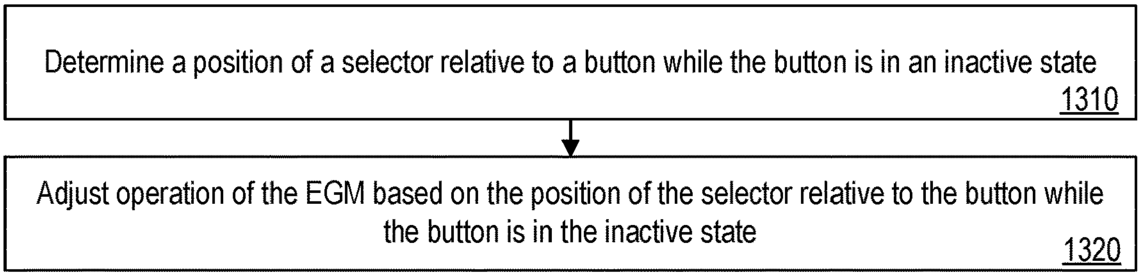
FIGS. 13-15 are flow charts illustrating examples of operations performed by an EGM according to some embodiments.
Figure 14:
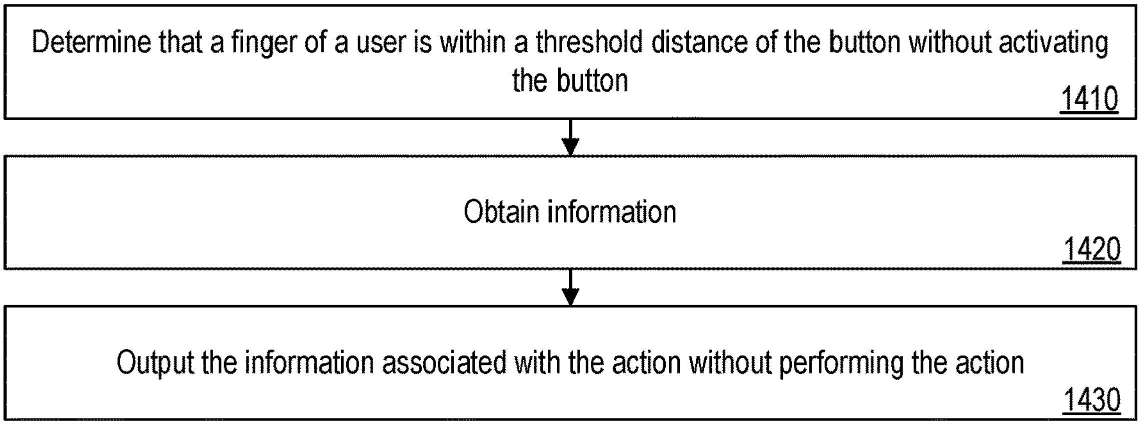
Figure 15:
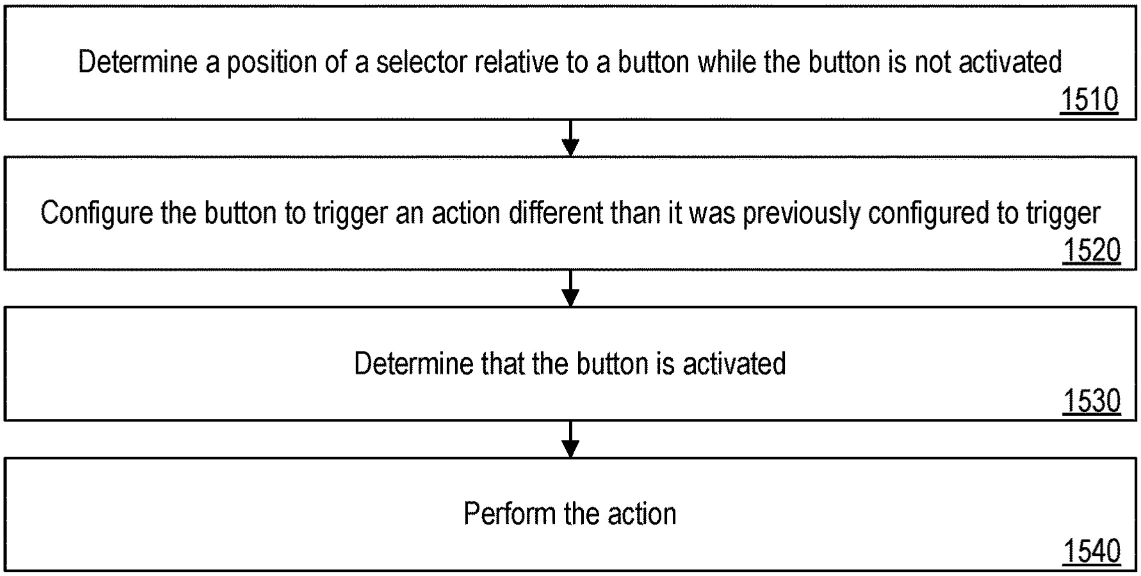

FIGS. 13-15 illustrates examples of operations performed by an EGM according to some embodiments. Although the operations will be described in regards to EGM 100 of FIG. 2B, the operations can be performed by other elements of EGM 100 and/or by any suitable EGM.

In FIG. 13, at block 1310, processing circuit 12 determines a position of a selector relative to a button while the button is in an inactive state. In some embodiments, determining the position of the selector relative to the button includes determining that the selector is at least one of: not touching the button and less than a threshold distance from the button; not touching the button and that a tip of the selector is within a space defined by a volume extending from a surface of the button; and touching the button and that less than a threshold amount of pressure is being applied to the button.

In additional or alternative embodiments, the selector is a finger of a user or a selection tool controlled by the user.

In additional or alternative embodiments, the button is coupled to the processor circuit and the button is a physical button configured to switch from an inactive state to an active state while the button is at least one of: being touched by the selector; and receiving a threshold amount of pressure from the selector.

In additional or alternative embodiments, a display device is communicatively coupled to the processor circuit and configured to display the button. The button is a virtual button configured to switch from the inactive state to an active state while the button is at least one of: being touched by the selector; and receiving a threshold amount of pressure from the selector.

In additional or alternative embodiments, a sensor device is communicatively coupled to the processor circuit and configured to determine the position of the sensor relative to the button. The sensor device includes at least one of: a camera; a RF sensor, a pressure sensor; and a touch sensor.

At block 1320, processing circuit 12 adjusts operation of the EGM based on the position of the selector relative to the button while the button is in the inactive state. In some embodiments, an active state of the button is associated with an action. Adjusting the operation of the EGM includes outputting information associated with the action based on the position of the selector relative to the button while the button is in the inactive state. In some examples, the action includes placing a first wager and the information includes at least one of: an indication of a type of the first wager; an explanation of the first wager; odds associated with the first wager; a currently configured wager size; a maximum wager size; a minimum wager size; an indication of a second wager that has been placed; and updated game information.

In additional or alternative examples, the first wager includes a wager on a sporting event. Adjusting the operation of the EGM includes obtaining the updated game information. The updated game information includes at least one of: current weather conditions associated with the sporting event; and a broadcast of the sporting event.

In additional or alternative examples, the action includes placing a first wager and adjusting the operation of the EGM includes determining that a user associated with the selector is not authorized to place the first wager and, responsive to determining that the user is not authorized to place the first wager, preventing the first wager from being placed in response to action.

In additional or alternative examples, the action includes an action during a gambling game and the information includes an indication of the action. For example, the gambling game can include a card game and the information can include an indication of a card associated with the action.

In additional or alternative embodiments, adjusting the operation of the EGM includes adjusting the operation of the EGM based on predetermined configurations set by a user associated with the selector.

In additional or alternative embodiments, an active state of the button is associated with an action. Adjusting the operation of the EGM includes outputting audio, visual, or haptic feedback associated with the action.

In FIG. 14, at block 1410, processing circuit 12 determines that a finger of a user is within a threshold distance of the button without activating the button. In some embodiments, the EGM determines an identity of the user and determines the threshold distance based on the identity of the user.

At block 1420, processing circuit 12 obtains information associated with the button, a game function associated with the button, or the user. In some embodiments, activating the button triggers placement of a first wager. In some examples, the first wager includes a wager on a sporting event. Obtaining the information can include, responsive to determining that a finger of a user is within a threshold distance of the button without activating the button, obtaining updated game information, the updated game information including at least one of: current weather conditions associated with the sporting event; and a broadcast of the sporting event.

At block 1430, processing circuit 12 outputs the information associated with the action without performing the action. In some embodiments, the action includes placing a first wager and the information includes at least one of: an indication of a type of the first wager; an explanation of the first wager; odds associated with the first wager; a currently configured wager size; a maximum wager size; a minimum wager size; an indication of a second wager that has been placed; and updated game information.

In additional or alternative embodiments, obtaining the information includes determining an identity of the user. Outputting the information includes determining configuration information based on the identity of the user and determining the information associated with the action based on the configuration information.

In FIG. 15, at block 1510, processing circuit 12 determines a position of a selector relative to a button while the button is not activated. At block 1520, processing circuit 12 configures the button to trigger an action different than it was previously configured to trigger. At block 1530, processing circuit 12 determines that the button is activated. At block 1540, processing circuit 12 performs the action.

Various operations from the flow chart of FIGS. 13-15 may be optional with respect to some embodiments of EGMs and related methods.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the FIGS. illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising." when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. An electronic gaming machine ("EGM"), the EGM comprising:

a processor circuit; and a memory coupled to the processor circuit, the memory comprising non-transitory machine-readable instructions that, when executed by the processor circuit, cause the EGM to perform operations comprising:

determining a position of a selector relative to a button while the button is in an inactive state; and adjusting operation of the EGM based on the position of the selector relative to the button while the button is in the inactive state.

2. The EGM of claim 1, wherein determining the position of the selector relative to the button comprises determining that the selector is at least one of:

not touching the button and less than a threshold distance from the button;

not touching the button and that a tip of the selector is within a space defined by a volume extending from a surface of the button; and touching the button and that less than a threshold amount of pressure is being applied to the button.

3. The EGM of claim 1, wherein the selector comprises a finger of a user or a selection tool controlled by the user.

4. The EGM of claim 1, further comprising:

the button coupled to the processor circuit, the button being a physical button configured to switch from the inactive state to an active state while the button is at least one of:

being touched by the selector; and receiving a threshold amount of pressure from the selector.

5. The EGM of claim 1, further comprising a display device configured to display the button, the button being a virtual button configured to switch from the inactive state to an active state while the button is at least one of:

being touched by the selector; and receiving a threshold amount of pressure from the selector.

6. The EGM of claim 1, further comprising:

a sensor device configured to determine the position of the sensor relative to the button, the sensor device including at least one of:

a camera;

a radio frequency ("RF") sensor;

a pressure sensor; and a touch sensor.

7. The EGM of claim 1, wherein an active state of the button is associated with an action, and wherein adjusting the operation of the EGM comprises outputting information associated with the action based on the position of the selector relative to the button while the button is in the inactive state.

8. The EGM of claim 7, wherein the action comprises placing a first wager, and wherein the information comprises at least one of:

an indication of a type of the first wager;

an explanation of the first wager;

odds associated with the first wager;

a currently configured wager size;

a maximum wager size;

a minimum wager size;

an indication of a second wager that has been placed; and updated game information.

9. The EGM of claim 8, wherein the first wager comprises a wager on a sporting event, wherein adjusting the operation of the EGM comprises obtaining the updated game information, and wherein the updated game information comprises at least one of:

current weather conditions associated with the sporting event; and a broadcast of the sporting event.

10. The EGM of claim 7, wherein the action comprises placing a first wager, and wherein adjusting the operation of the EGM comprises:

determining that a user associated with the selector is not authorized to place the first wager; and responsive to determining that the user is not authorized to place the first wager, preventing the first wager from being placed in response to action.

11. The EGM of claim 7, wherein the action comprises an action during a gambling game, and wherein the information comprises an indication of the action.

12. The EGM of claim 11, wherein the gambling game comprises a card game, and wherein the information comprises an indication of a card associated with the action.

13. The EGM of claim 1, wherein adjusting the operation of the EGM comprises adjusting the operation of the EGM based on predetermined configurations set by a user associated with the selector.

14. The EGM of claim 1, wherein an active state of the button is associated with an action, and wherein adjusting the operation of the EGM comprises outputting audio, visual, or haptic feedback associated with the action.

15. An electronic gaming machine ("EGM"), the EGM comprising:

a processor circuit;

a button coupled to the processor circuit and configured to trigger an action in response to being activated; and a memory coupled to the processor circuit, the memory comprising non-transitory machine-readable instructions that, when executed by the processor circuit, cause the EGM to perform operations comprising:

determining that a finger of a user is within a threshold distance of the button without activating the button; and responsive to determining that a finger of a user is within a threshold distance of the button without activating the button, outputting information associated with the action without performing the action.

16. The EGM of claim 15, wherein the action comprises placing a first wager, and wherein the information comprises at least one of:

an indication of a type of the first wager;

an explanation of the first wager;

odds associated with the first wager;

a currently configured wager size;

a maximum wager size;

a minimum wager size;

an indication of a second wager that has been placed; and updated game information.

17. The EGM of claim 16, wherein the first wager comprises a wager on a sporting event, the operations further comprising:

responsive to determining that a finger of a user is within a threshold distance of the button without activating the button, obtaining the updated game information, the updated game information including at least one of:

current weather conditions associated with the sporting event; and a broadcast of the sporting event.

18. The EGM of claim 15, the operations further comprising:

responsive to determining that a finger of a user is within a threshold distance of the button without activating the button, determining an identity of the user;

determining configuration information based on the identity of the user, wherein outputting the information associated with the action comprises determining the information associated with the action based on the configuration information.

19. The EGM of claim 15, the operations further comprising:

determining an identity of the user; and determining the threshold distance based on the identity of the user.

20. An electronic gaming machine ("EGM"), the EGM comprising:

a processor circuit;

a button coupled to the processor circuit and configured to trigger a first action in response to being activated; and a memory coupled to the processor circuit, the memory comprising non-transitory machine-readable instructions that, when executed by the processor circuit, cause the EGM to perform operations comprising:

determining a position of a selector relative to the button while the button is not activated;

responsive to determining the position of the selector relative to the button while the button is not activated, configuring the button to trigger a second action in response to being activated, the second action being different than the first action;

subsequent to configuring the button to trigger the second action, determining that the button is activated; and responsive to determining that the button is activated, performing the second action.

* * * * *